United States Patent
Cousy

(10) Patent No.: US 6,512,338 B2
(45) Date of Patent: Jan. 28, 2003

(54) CONTROL DEVICE FOR AN APPLIANCE ADAPTED TO ASSUME A LEVEL SELECTED FROM A RANGE OF LEVELS, METHOD OF CONTROLLING A ROLLER BLIND USING THE DEVICE, AND USER MODULE FOR THE DEVICE

(75) Inventor: Jean-Pierre Cousy, Verneuil sur Vienne (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 09/741,418

(22) Filed: Dec. 21, 2000

(65) Prior Publication Data

US 2002/0135307 A1 Sep. 26, 2002

(30) Foreign Application Priority Data

Dec. 22, 1999 (FR) .............................. 99 16223

(51) Int. Cl.$^7$ .............................................. H05B 41/18
(52) U.S. Cl. ...................... 315/362; 315/194; 315/307; 340/309.15; 340/825.06; 340/825.22; 340/825.36; 340/825.37; 345/173; 318/468
(58) Field of Search ................................. 315/194, 291, 315/293, 307, 362; 340/309.15, 825.06, 825.22, 825.36, 825.37; 345/168, 173, 163; 318/445, 466, 468, 484

(56) References Cited

U.S. PATENT DOCUMENTS

| | | | |
|---|---|---|---|
| 4,803,854 A | 2/1989 | Kikuchi et al. .............. 68/12 R |
| 5,369,342 A | 11/1994 | Rudzewicz et al. .......... 318/102 |
| 5,449,987 A | 9/1995 | McMillan .................... 318/266 |
| 5,485,058 A | 1/1996 | Watson et al. ............... 315/194 |
| 5,654,739 A | 8/1997 | Sakai et al. .................. 345/134 |
| 5,818,428 A | 10/1998 | Eisenbrandt et al. ........ 345/173 |
| 5,854,545 A | 12/1998 | Eibel .......................... 318/169 |

FOREIGN PATENT DOCUMENTS

| | | |
|---|---|---|
| DE | 9110348 | 11/1991 |
| DE | 29602328 U1 | 7/1997 |
| EP | 0268933 A2 | 6/1988 |
| EP | 0574637 A1 | 12/1993 |
| EP | 0784146 A1 | 7/1997 |
| WO | WO9743747 | 11/1997 |

*Primary Examiner*—Don Wong
*Assistant Examiner*—Thuy Vinh Tran
(74) *Attorney, Agent, or Firm*—Young & Thompson

(57) ABSTRACT

A control device for an appliance which can assume a level selected from a range of levels includes a keypad representative of the range of levels to enable a user to select a level, an "off" key for switching off the appliance, and a processor unit connected to the keypad and to the "off" key. If the appliance is off and the keypad is operated to select a target level, the processor unit causes the appliance to assume the selected target level. If the appliance is off and the "off" key is operated, the processor unit leaves the appliance off. If the appliance is on and the keypad is operated to select a target level, the processor unit causes the appliance to assume the selected target level if that level is different from its current level. If the appliance is on and the "off" key is operated, the processor unit switches off the appliance.

49 Claims, 8 Drawing Sheets

APPLIANCE SET POINT

DISPLAY SET POINT

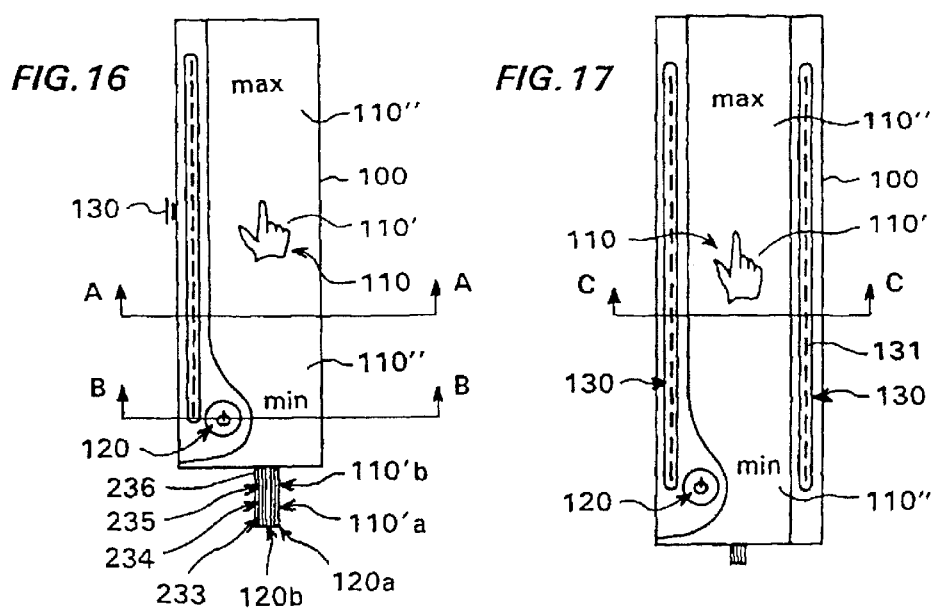
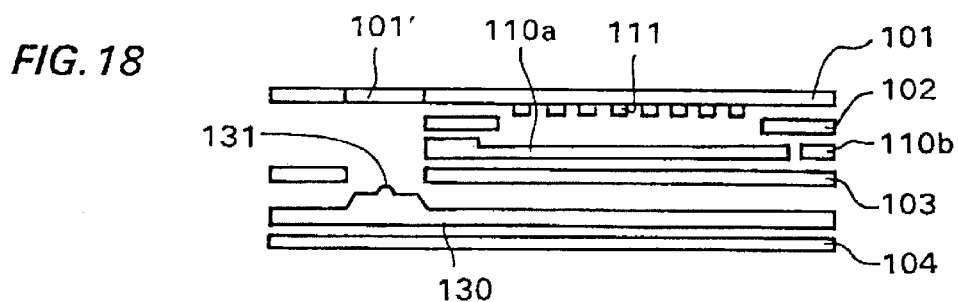
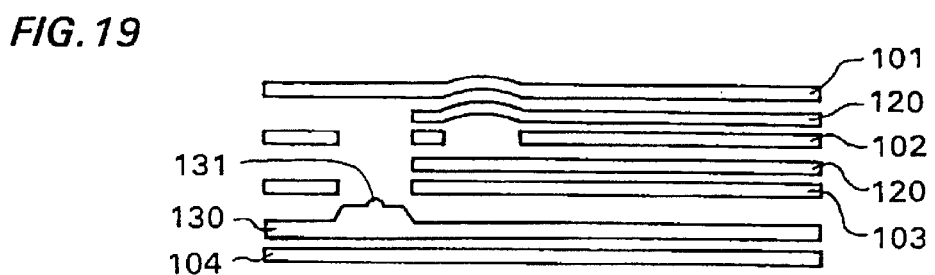
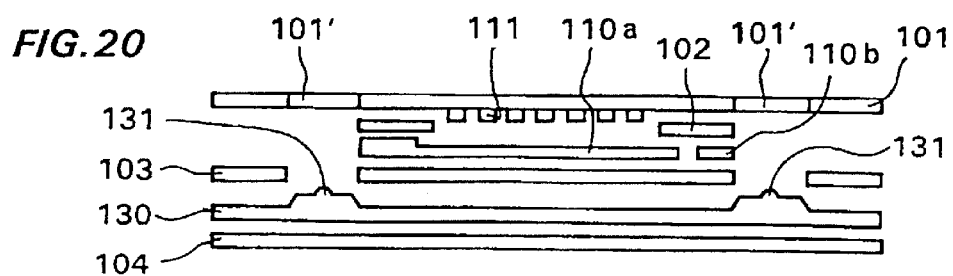

CONTROL DEVICE FOR AN APPLIANCE ADAPTED TO ASSUME A LEVEL SELECTED FROM A RANGE OF LEVELS, METHOD OF CONTROLLING A ROLLER BLIND USING THE DEVICE, AND USER MODULE FOR THE DEVICE

BACKGROUND OF THE INVENTION

1. Field of the Invention

The present invention relates generally to controlling appliances such as lamps, roller blinds or heating appliances adapted to assume a level selected from a range of levels.

It relates more particularly to a control device which includes a keypad representative of said range of levels to enable a user to select a level.

It also relates to a method of controlling a roller blind to move it from a current position to a target position using the control device and a user module for the device.

2. Description of the Prior Art

A rotary dimmer including a potentiometer for varying the angle of opening of an electronic switch of a lamp is known in the art. The dimmer also includes an on/off switch for switching the lamp on and off.

U.S. Pat. No. 5,485,058 describes a lamp control device which includes a keypad with five keys, namely an on/off key and four level keys each of which represents one preset level of brightness of the lamp. The keypad is connected to a central processor unit and:

- if the lamp is off and the on/off key is operated, the lamp assumes the brightness level that it had before it was switched off,
- if the lamp is switched off and one of the four level keys is operated, the lamp assumes progressively all the intermediate brightness levels from the off level to the target preset level selected by the key operated,
- if the lamp is on and one of the four level keys is operated, the lamp progressively assumes all the intermediate brightness levels from its current level to a preset target brightness level selected by the level key operated, and
- if the lamp is switched on and the on/off key is operated, the lamp is switched off.

Apart from the fact that the control device is very complicated, it obliges the lamp to pass through intermediate levels before reaching the target level selected by the user.

This also applies to the conventional dimmer previously described using a potentiometer.

Compared to the above prior art, the invention proposes a new control device for an appliance adapted to assume a level selected from a range of levels enabling the appliance to access directly the level selected by the user from the keypad, without passing through intermediate levels, which makes use of the appliance safer by separating the control for switching off the appliance from the other controls.

SUMMARY OF THE INVENTION

The control device according to the invention includes a keypad representative of the range of levels to enable a user to select a level, an "off" key for switching off the appliance, and a processor unit connected to the keypad and to the "off" key, and in the device:

- when the appliance is off and the keypad is operated to select a target level, the processor unit causes the appliance to assume the selected target level,
- when the appliance is off and the "off" key is operated, the processor unit leaves the appliance switched off,
- when the appliance is on and the keypad is operated to select a target level, the processor unit causes the appliance to assume the selected target level if that level is different from its current level, and
- when the appliance is on and the "off" key is operated, the processor unit switches off the appliance.

Thus in accordance with the invention the off key of the control device cannot be used to switch it on, as is conventionally the case with control devices known in the art.

Preferably, in accordance with the invention, the processor unit includes means for monitoring separately operation of the keypad and operation of the "off" key.

The following are further advantageous and non-limiting features of the device according to the invention.

The device includes means for displaying the current level of the appliance connected to the processor unit.

The processor unit is adapted to maintain the display means active after the appliance is switched off to show the current level of the appliance before it was switched off.

Accordingly, when the appliance is switched off, the display means provide the user with an indication of the current level of the appliance before it was switched off and the user can operate the keypad if he wishes to switch on the appliance at that level or at a selected other target level.

The processor unit is adapted to place the display means in a standby state after the appliance is switched off.

The standby state of the display means consists of a reduced brightness of the display means.

The device includes means for displaying a change of level of the appliance.

The display means include at least one row of light-emitting diodes facing the keypad.

The display means include at least one row of bargraphs.

The device according to the invention advantageously includes keypad marking means. The marking means can intentionally be placed on standby, at a background level relative to the display of the current level or the target level for the appliance.

In one embodiment of the control device according to the invention the keypad has at least one touch-sensitive region provided with means for recognizing an area of the touch-sensitive region pressed by a finger and corresponding to the selection of a target level to be assumed by the appliance and the recognition means are connected to the processor unit which is adapted to determine from the recognized pressed area and to transmit to the appliance an appliance set point such that the appliance assumes the selected target level.

The touch-sensitive region comprises three subregions, namely:

- a top subregion representing a top limit level assumed by the appliance,
- a bottom subregion representing a bottom limit level assumed by the appliance, and
- an intermediate subregion between the top and bottom subregions and representative of a range of intermediate levels assumed by the appliance between the top and bottom limit levels.

The recognition means of the touch-sensitive region are of the resistive type.

The recognition means include an open circuit whose terminals are connected to the processor unit and which is formed of two comb-like parts with substantially parallel resistive backs and interleaved conductive teeth, the touch-sensitive region being such that pressing a finger onto an area of the touch-sensitive region closes the circuit by virtue of contact between at least one tooth of one part with at least one tooth of the other part, the processor unit including means for reading off the value of the resistance between the terminals of the closed circuit, the resistance being representative of the area pressed, and means for determining from the resistance read off an appliance set point to be transmitted to the appliance so that the appliance assumes the corresponding selected target level.

In another embodiment of the control device according to the invention the keypad includes a movable button controlling a variable resistance, movement of the button corresponding to selection of a target level to be assumed by the appliance, and an "on" key connected to the processor unit and integrated into the movable button, the processor unit including means for reading off the resistance of the variable resistance when the "on" key is operated, the resistance being representative of the position of the button, and means for determining from the resistance read off an appliance set point to be transmitted to the appliance so that the appliance assumes the corresponding selected target level.

The processor unit includes means for determining a display set point from the resistance read off and means for transmitting the display set point to the display means to display the corresponding selected target level assumed by the appliance.

The control device according to the invention can include an external installation connected to the processor unit and adapted to supply a set point for selecting a target level in the range of levels to the processor unit which is adapted to transmit the set point to the appliance so that it assumes the selected target level if it is different from its current level.

In this case the processor unit includes means for controlling the priorities of information that it receives from the keypad and from the external installation so that the information from the keypad has a higher priority than the information from the external installation.

The external installation can be a meteorological station, a detector responsive to the presence of a person or a thermostat.

The appliance controlled by a control device according to the invention can be a lamp, in which case the levels assumed by the appliance are brightness levels varying between a bottom limit level corresponding to a minimum brightness and a top limit level corresponding to a maximum brightness, and the processor unit is adapted, when the keypad is operated, to determine a fractional brightness and transmit it to the lamp.

The processor unit is typically adapted to provide the lamp with direct access to a brightness level selected using the keypad.

The appliance controlled by the control device according to the invention can be a roller blind in which case the levels to be assumed by the device are positions of the blind varying between top and bottom limit levels corresponding to top and bottom end of travel positions of the blind and the processor unit is adapted, when the keypad is operated, to determine and to transmit to the blind an instruction to raise or lower the blind for a given time so that the blind reaches the selected position.

The processor unit determines the time for which the blind is raised or lowered by means of an initialization operation during which the processor unit causes the blind to move between the top and bottom end of travel positions, measures the time taken by the blind to perform the movement, and stores the measured time.

The processor unit advantageously includes means for storing the current level of the appliance, i.e. the current position of the blind, and, when a target level, i.e. a target position of the blind, is selected by operating the keypad, to determine and to transmit to the blind the instruction to raise or lower the blind for a given time so that it reaches the selected target position from its current position.

The expression "current position of the blind" means either the time for the blind to move between its actual current position and one of the top and bottom end of travel position positions (referred to as the displacement time) or the resistance of the keypad corresponding to the current position.

The processor unit preferably includes means for moving the blind directly to its top end of travel position, respectively bottom end of travel position, if a target level is selected by operating the keypad that is above, respectively below, a particular top threshold, respectively a particular bottom threshold.

The processor unit can also include means for updating the displacement time of the blind for its entire travel if the blind reaches the top end of travel position, respectively bottom end of travel position, when the blind raising time, respectively the blind lowering time, determined by the processor unit has not totally elapsed.

A method in accordance with the invention of controlling a roller blind to move it from a target position to a current position, using a control device as defined hereinabove includes the following steps, starting from operation of the keypad:

a) determining the target position selected by operating the keypad, b) determining the displacement time of the blind between its current position and the target position, c) determining the direction of displacement of the blind, i.e. raising it or lowering it, for it to reach the selected target position from its current position, d) raising or lowering the blind for the time determined in step b) so that the blind reaches the target position, and e) storing the target position as the current position of the blind, in which method steps a) to d) are executed so that, if the roller blind is switched on and the keypad is operated to select a target position, the blind assumes the selected target position if it is different from its current position.

The method includes an initialization operation executed when the control device is switched on and which includes the following steps:

1) moving the blind to an end of travel position, 2) starting a timer, 3) moving the blind to an opposite end of travel position, 4) stopping the timer and reading off the time counted by the timer, and 5) storing the time counted by the timer as the displacement time of the blind for an entire travel.

In one preferred embodiment of the method, during the initialization operation, the blind is lowered to the bottom end of travel position in step 1), the blind is raised to the top end of travel position in step 3), and the displacement time of the blind for an entire travel stored in step 5) is a blind raising time.

A display set point is initialized during the initialization operation to display the top end of travel position of the blind.

In the method according to the invention, if the target position selected by operating the keypad is greater than or equal to, respectively less than or equal to, a top threshold, respectively a bottom threshold, the blind is moved directly to the top end of travel position, respectively the bottom end of travel position.

In the method according to the invention, if the blind reaches a top or bottom end of travel position in step d) before the time determined in step b) has totally elapsed, the displacement time of the blind for an entire travel is advantageously updated.

In one embodiment of the method according to the invention a resistance at the terminals of a resistive circuit of the keypad is read off in step a) and the displacement time of the blind as a function of its displacement time for an entire travel is determined in step b) from the difference between resistances read off corresponding to the current position and the target position and from the difference between resistances read off corresponding to the top and bottom end of travel positions.

In the method according to the invention, starting from the initialization operation, the displacement of the blind between its current position and the target position is displayed by successively turning light-emitting diodes on and off.

In accordance with the invention, the current position of the blind is displayed between two operations of the keypad.

When the keypad is operated, the target position is displayed simultaneously with the displacement of the blind.

The blind can be stopped at any time by operating the "off" key.

The invention also provides a user module for a control device as defined hereinabove, which user module includes:
- an elongate touch-sensitive region constituting the control keypad of the control device,
- an "off" key located near one end of the touch-sensitive region, and
- means for displaying the current level and the target level of the appliance extending in a line along at least one longitudinal side of the touch-sensitive region.

According to other advantageous and non-limiting features of the module:
- the display means extend from the "off" key to the opposite end of the touch-sensitive region,
- the display means extend along both longitudinal sides of the touch-sensitive region,
- the display means include at least one row of diodes regularly spaced along the touch-sensitive region,
- the touch-sensitive region is subdivided into three subregions:
  - a top subregion representing a top limit level assumed by the appliance,
  - a bottom subregion representing a bottom limit level assumed by the appliance, and
  - an intermediate subregion between the top and bottom subregions and representative of a range of intermediate levels assumed by the appliance between the top and bottom limit levels,
- the touch-sensitive region has means for recognizing an area of the touch-sensitive region pressed by a finger and corresponding to the selection of a target level to be assumed by the appliance and the recognition means are connected to the processor unit which is adapted, from the recognized pressed area, to determine and to transmit to the appliance an appliance set point such that it assumes the selected target level,
- the recognition means of the touch-sensitive region are of the resistive type,
- the recognition means include an open circuit whose terminals are connected to the processor unit and which is formed of two comb-like parts with substantially parallel resistive backs and interleaved conductive teeth, the touch-sensitive region being such that pressing a finger onto an area of the touch-sensitive region closes the circuit by virtue of contact between at least one tooth of one part with at least one tooth of the other part, the processor unit including means for reading off the value of the resistance between the terminals of the closed circuit, the resistance being representative of the area pressed, and means for determining from the resistance read off an appliance set point to be transmitted to the appliance so that the appliance assumes the corresponding selected target level,
- the touch-sensitive region has substantially parallel conductive tracks extending generally transversely to and above the interleaved teeth of the two parts of the circuit and the conductive tracks are adapted, when a finger presses on the touch-sensitive region, to come into contact with at least one tooth of each of the parts of the circuit to close it at the level of the pressed area,
- the touch-sensitive region has at one end, respectively at an opposite end, an indication for the user of the top limit level, respectively the bottom limit level, that can be assumed by the appliance, and
- the "off" key is located near the end of the touch-sensitive region having the indication of the bottom limit level that can be assumed by the appliance.

The following description, which is given with reference to the accompanying drawings, which are provided by way of non-limiting example, explains in what the invention consists and how it can be put into effect.

BRIEF DESCRIPTION OF THE DRAWINGS

FIGS. 16 and 17 are front views of two embodiments of a user module according to the invention.

FIGS. 18 and 19 are views of the user module shown in FIG. 16 in section taken along the respective lines A—A and B—B.

FIG. 20 is a view of the user module shown in FIG. 17 in section taken along the line C—C.

DETAILED DESCRIPTION OF THE PREFERRED EMBODIMENTS

Figure 1:
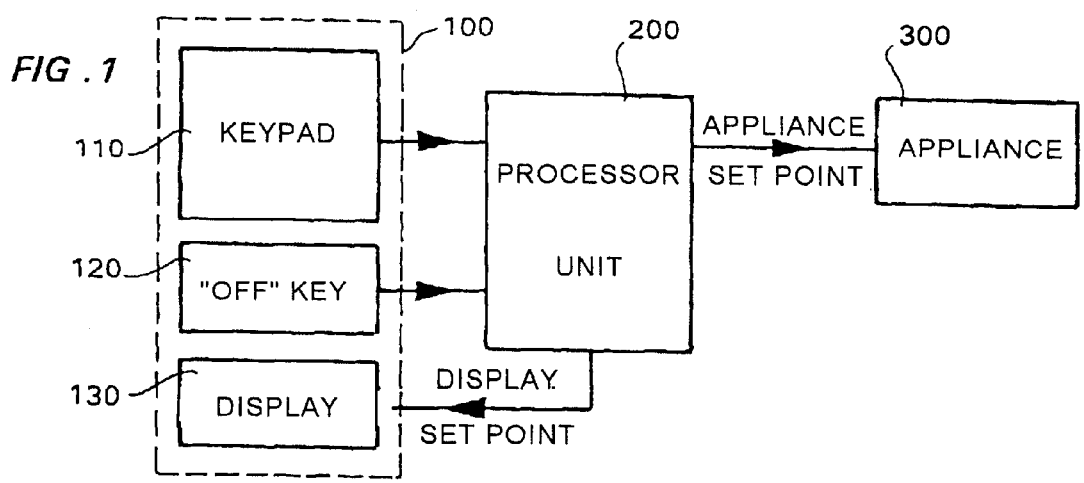
FIG. 1 is a block diagram representing the main components of the control device in accordance with the invention connected to an appliance.

FIG. 1 is a block diagram of a control device for an appliance 300 adapted to assume a level selected from a predetermined range of levels.

The control device includes a keypad 110 representative of the range of levels to enable a user to select a level, a key 120 for switching off the appliance 300 and a processor unit 200 with inputs connected to the keypad 110 and the off key 120 and an output connected to the appliance 300. The control device is such that:

when the appliance 300 is off and the keypad 110 is operated to select a target level, the appliance is caused to assume the selected target level, when the appliance 300 is off and the off key 120 is operated, the appliance remains off, when the appliance 300 is on and the keypad 110 is operated to select a target level, the appliance is caused to assume the selected target level if that is not the same as its current level, and when the appliance 300 is on and the off key 120 is operated, the appliance is switched off.

In this example the control device further includes means 130 for displaying the current level of the appliance 300 connected to the processor unit 200.

Figure 2:
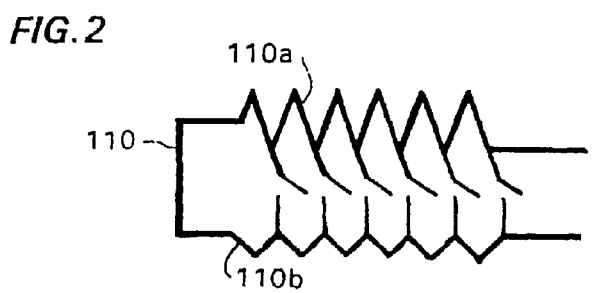
FIG. 2 is a diagram of one embodiment of a keypad of the control device shown in FIG. 1.

The keypad 110 is of the resistive type (see FIG. 2).

Figure 3:
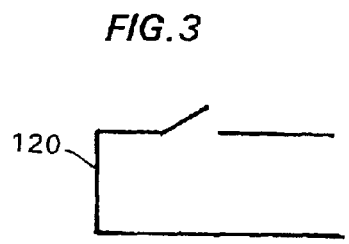
FIG. 3 is a diagram of one embodiment of an off key of the device shown in FIG. 1.

The off key 120 incorporates a switch (see the FIG. 3 electrical diagram).

Figure 4:
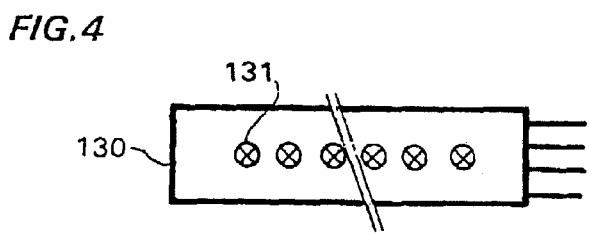
FIG. 4 is a diagram of one embodiment of display means of the device shown in FIG. 1.

In this example the display means 130 include at least one row of light-emitting diodes 131 (see FIG. 4).

In a preferred embodiment of the control device shown in FIG. 1 the keypad 110, the off key 120 and the display means 130 are integral parts of a user module 100.

FIGS. 16 to 21 show three preferred embodiments of the user module 100.

As can be seen in FIGS. 16 to 21, the user module 100 has an elongate touch-sensitive region 110 constituting the control keypad of the control device, an off key 120 near one end of the touch-sensitive region 110, and means 130 for displaying the current level of the appliance extending along at least one longitudinal side of the touch-sensitive region 110.

In the first embodiment, shown in FIG. 16, the display means 130 extend along one longitudinal side of the touch-sensitive region 110.

Figure 21:
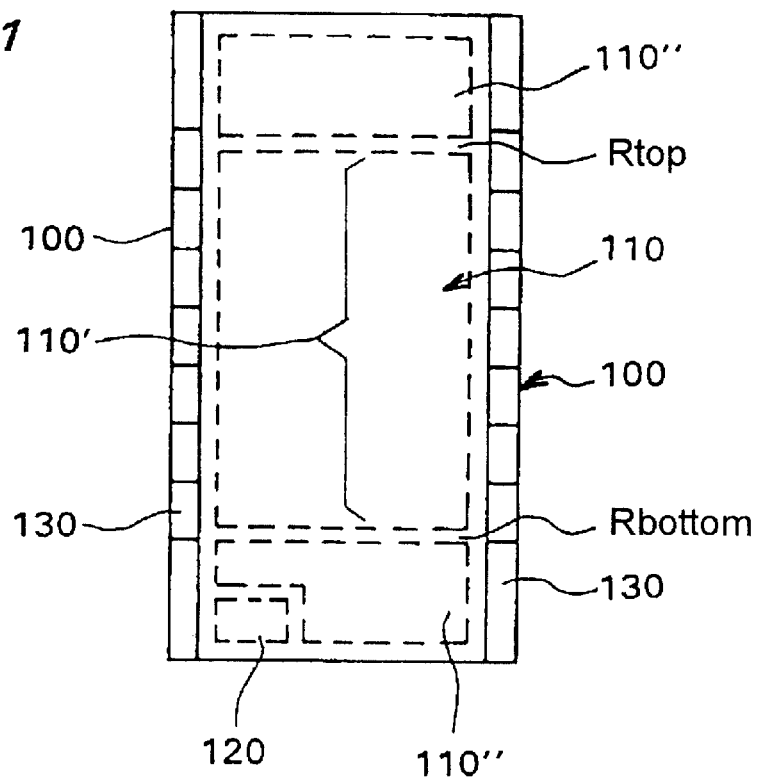
FIG. 21 is a front view of another embodiment of the user module according to the invention.

In the second and third embodiments, respectively shown in FIGS. 17 and 21, the display means 130 extend along both longitudinal sides of the touch-sensitive region 110. These embodiments are more user-friendly for a left-handed person whose hand could otherwise, when operating the keypad, block their view of a part of the display means 130 on the left-hand side of the touch-sensitive region 110 (see FIG. 16).

As can be seen in FIGS. 16, 17 and 21, the display means 130 extend from the off key 120 to the opposite end of the touch-sensitive region 110.

In this example the display means include a row of regularly spaced diodes 131 along one or both longitudinal sides of the touch-sensitive region.

In a different embodiment, not shown, the display means 130 can include at least one row of bargraphs.

As shown in the sectional views of FIGS. 18 to 20, the user module 100 has a decorative face 101 consisting of a flexible plastics material membrane, for example, which covers a sandwich material incorporating printed circuits and insulative material spacers.

In the region of the display means, the decorative face 101 includes windows 101' through which the light produced by the diodes 131 located under the decorative face passes. At opposite ends of the touch-sensitive region 110 the decorative face 101 carries an indication to the user of a top limit level, respectively a bottom limit level, that the appliance can assume.

In this regard, in the embodiment of the user module 100 shown in FIG. 21, the touch-sensitive region 110 constituting the keypad is subdivided into three subregions:

a top region 110" representing the top limit level assumed by the appliance, which is above a threshold value Rtop, a bottom region 110" representing the bottom limit level that the appliance can assume, which is below a threshold value Rbottom, and an intermediate region 110' between the threshold values Rtop and Rbottom representing a range of intermediate levels assumed by the appliance between the top and bottom limit levels.

In the embodiment shown in FIG. 21, for simplicity, there is one light-emitting diode on each side of each of the top and bottom regions of the touch-sensitive region 110.

In the embodiments shown in FIGS. 16, 17 and 21 there are sixteen light-emitting diodes 131 on one side of the touch-sensitive region 110 to indicate sixteen different levels that the appliance can assume.

The touch-sensitive region 110 is also provided with means for recognizing an area of the touch-sensitive region pressed by a finger, corresponding to the selection of a target level to be assumed by the appliance, the recognition means being connected to the processor unit by connecting means 110'a, 110'b and the processor unit being adapted, on recognizing the pressed area, to determine and to transmit to the appliance an appliance set point such that it assumes the selected target level.

The recognition means of the touch-sensitive region are more particularly of the resistive type.

In this example they include an open circuit (see FIG. 2 in particular) whose terminals are connected to the processor unit and which takes the form of two comb-shaped parts 110a, 110b whose resistive backs are substantially parallel and whose conductive teeth are interleaved.

In this embodiment the parts 110a, 110b are tracks of a printed circuit between a bottom spacer 103 consisting of an insulative material membrane forming a support for the printed circuit and an insulative material top spacer 102 between the printed circuit and the decorative face 101.

The resistive backs of the comb-shaped parts are parallel tracks of carbon-containing material and the interleaved conductive teeth are metal tracks.

The pitch of the conductive teeth of the circuit parts is of the order of 1 mm in this example.

The touch-sensitive region 110 is such that pressing the touch-sensitive area with a finger causes the resistive circuit 110*a*, 110*b* to be closed through contact of at least one tooth of a part 110*a* with at least one tooth of the other part 110*b*.

As explained in more detail later, the processor unit 200 includes means 210 for reading off the resistance between the terminals of the closed circuit, which is representative of the pressed area, and means 220 for determining from the resistance read off an appliance set point to be transmitted to the appliance so that it assumes the corresponding selected target level.

The resistance read off is between a minimum value of the order of 100Ω to 200Ω and a maximum value greater than or equal to 10 kΩ.

As described later, the processor unit further includes means for determining from the resistance read off a display set point to be transmitted to the display means to display the corresponding selected target level assumed by the appliance.

To close the resistance circuit 110*a*, 110*b* when a finger presses on an area of the touch-sensitive region 110, the touch-sensitive region has substantially parallel and electrically conductive metal tracks 111 on the inside face of the decorative face 101 of the user module which extend generally transversely to and above the interleaved conductive teeth of the two parts 110*a*, 110*b* of the circuit, the conductive tracks being adapted, when a finger presses on the touch-sensitive region, to come into contact with at least one tooth of each part of the circuit to close it at the level of the pressed area.

The off key 120 is positioned in the user module 100 near the end of the touch-sensitive region 110 carrying the indication of the bottom level that the appliance can assume.

The diodes 131 of the display means 130 are positioned so that they are in electrical contact with a circuit extending between the spacer 103 supporting the resistive circuit 110 and an insulative material bottom support 104 forming the bottom face of the user module. The printed circuit supporting the diodes makes the electrical connection to the processor unit 200.

The off key 120 includes a switch (see the FIG. 3 electrical diagram) consisting of two electrically conductive tracks 120 spaced from each other by the insulative spacer 102, namely a top track just below the decorative face 101 and a bottom track 120. The top track 120 has a domed part that can be deformed by a finger pressing on the decorative face 101 of the user module until it comes into contact with the bottom track 120 and closes the switch connected by two connections 120*a*, 120*b* to the processor unit. When the switch is closed, the processor unit transmits an off set point to the appliance.

The touch-sensitive region constituting the keypad in this example is connected to the processor unit by two connecting wires 110'*a*, 110'*b* and the display means have four matrix control connecting wires 233, 234, 235, 236 connected to the processor unit.

With regard to the display of the current level of the appliance 300 set by the control device described, the processor unit includes means enabling the display means to indicate a change of level of the appliance. If the display means consist of at least one row of light-emitting diodes, this is achieved by switching the diodes on and off successively as the level assumed by the appliance changes.

The control device can also include keypad marking means such as lighting means intentionally set to a standby level relative to the display of the current level of the appliance or its change of level.

Figure 5:
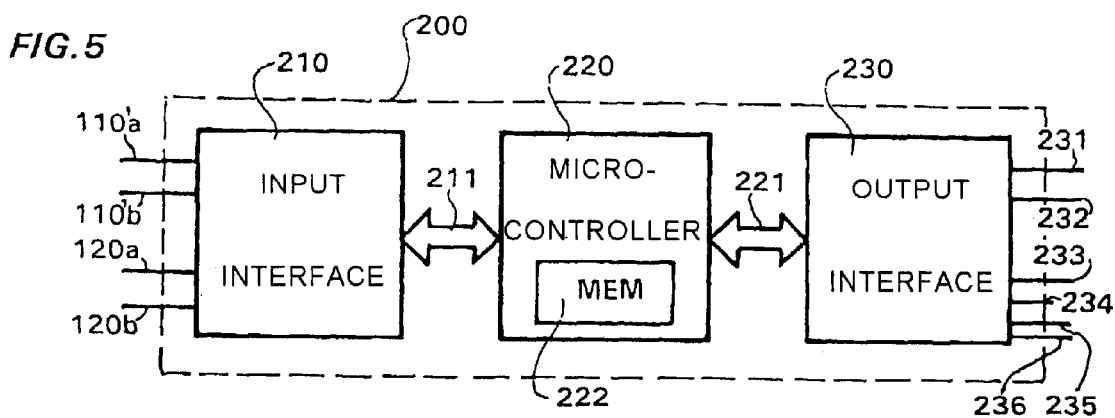
FIG. 5 is a block diagram representing the main components of a processor unit of the device shown in FIG. 1.

FIG. 5 is a block diagram showing the main components of the processor unit 200. At its input it has an input interface 210 to which the keypad 110 and the off key 120 are connected by separate connecting means in this example, as previously described, i.e. by two connecting wires 110'*a*, 110'*b* for the keypad 110 and two connecting wires 120*a*, 120*b* for the off key 120.

The processor unit therefore includes means for monitoring separately the operation of the keypad and the operation of the off key.

This can be effected by any other means, which can be more complex than separate connections of the keypad and the off key to the processor unit, for example a multiplexing system.

The input interface 210 includes means such as an ohmmeter for reading off the resistance between the terminals of the closed resistive circuit and constituting the means for recognizing the pressed area of the touch-sensitive region of the keypad, an analog-to-digital converter for converting the analog signal read off by the reading means into a digital signal, and means for correcting and filtering the resistance read off to enable the choice of a correct resistance if the movement of the user's finger over the touch-sensitive region 110 is not precise, for example if the user removes their finger slowly from the touch-sensitive region, generating intermediate impedance values.

The input interface 210 is connected by a bus 211 to a microcontroller 220 to which it transmits digital data via the bus.

The microcontroller 220 is in turn connected by a bus 221 to an output interface 230 connected to the appliance 300 by at least two connections 231, 232 to supply it an appliance set point determined by the processor unit under the control of the microcontroller 220 and to the display means 130 by four matrix control connecting wires 233 to 236 to supply the connecting means with a display set point determined by the processor unit under the control of the microcontroller 220.

Figure 6:
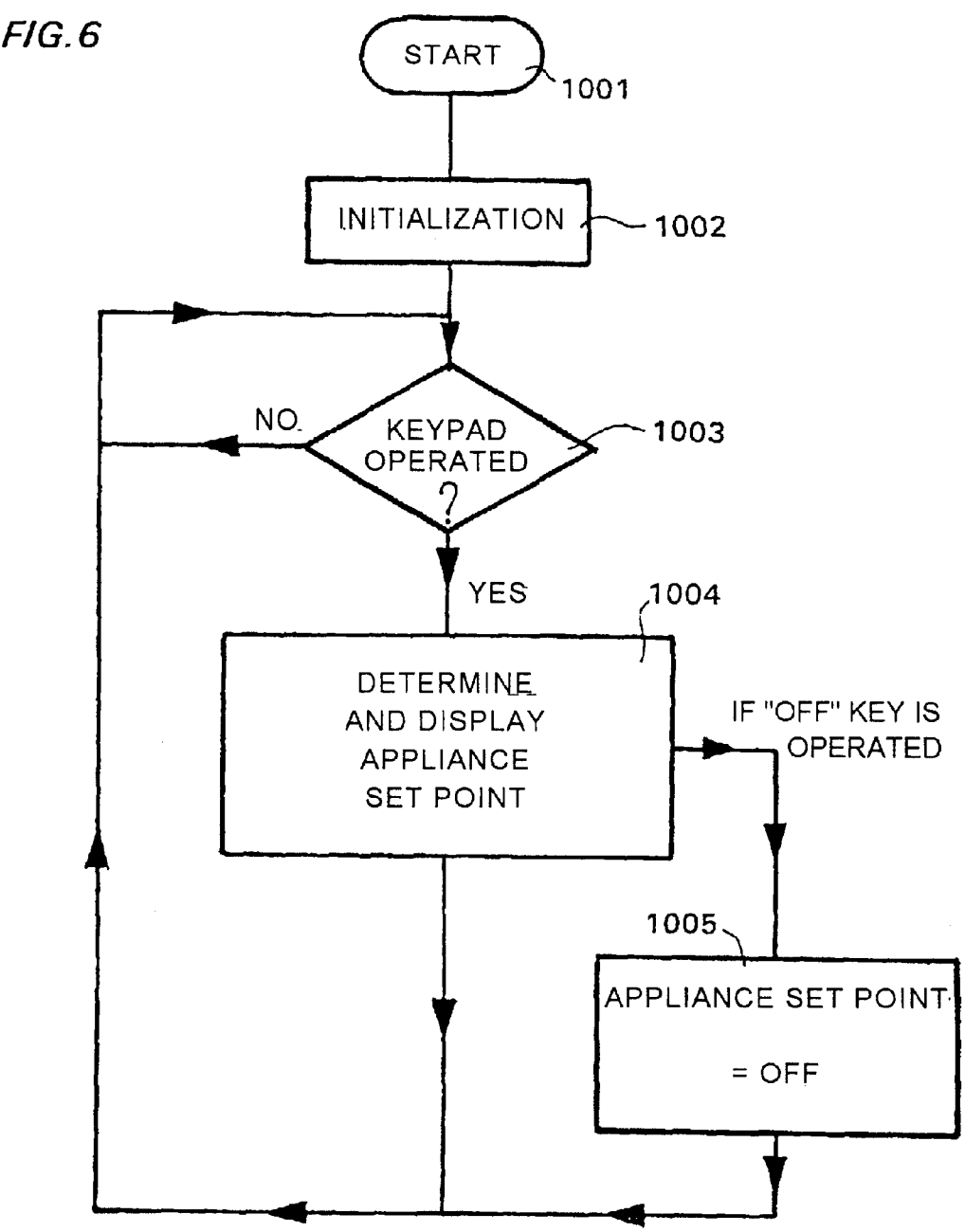
FIG. 6 is a flowchart of an operating program of the control device shown in FIG. 1.

FIG. 6 is a flowchart of an operating program of the control device according to the invention which is stored in the memory 222 of the microcontroller 220.

It should first be noted that, for simplicity, the operating program of the device is described and represented sequentially, although it is to be understood that the device is a multitasking device.

As shown in the flowchart, the operating program of the control device includes, when the appliance 300 is switched on (step 1001), an initialization step 1002 and then a test step 1003 during which the processor unit determines if the keypad has been operated or not. After the test step 1003, it includes a step 1004 for determining the appliance set point and the display set point, which is executed if the keypad has been operated. The appliance set point determined in step 1004 is then transmitted via the output interface to the appliance 300 so that the appliance assumes the corresponding selected target level and the display set point is also transmitted to the display means so that they display the target level reached by the appliance.

If the user operates the off key during the step 1004 of determining the appliance set point and the display set point, a step 1005 is executed so that the appliance set point assumes the off value.

The microcontroller 220 includes an area of the memory 222 in which it stores the values of the appliance set point and the display set point determined in this way.

In a first embodiment, the appliance to be controlled by the control device according to the invention is a lamp and the levels it assumes are brightness levels varying between a bottom limit level corresponding to zero brightness and a top limit level corresponding to maximum brightness. When the keypad 110 is operated, by executing a control task consisting of modifying the opening angle of an electronic switch connected to the lamp, the processor unit 200 determines and transmits to the lamp 300 a fractional brightness indication.

Figure 7:
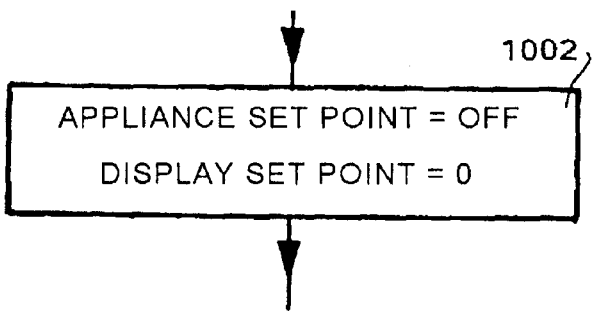
FIG. 7 explains the operation of initializing the operating program shown in FIG. 6 for a control device for a lamp.

When the appliance 300 is a lamp, the initialization step 1002 shown in FIG. 7 consists of the appliance set point assuming the off value and the display-set point assuming a value equal to zero, which corresponds to the fact that all the light-emitting diodes are turned off. It is also feasible for the display set point at initialization to be such that the diodes are set to a standby level.

Figure 8:
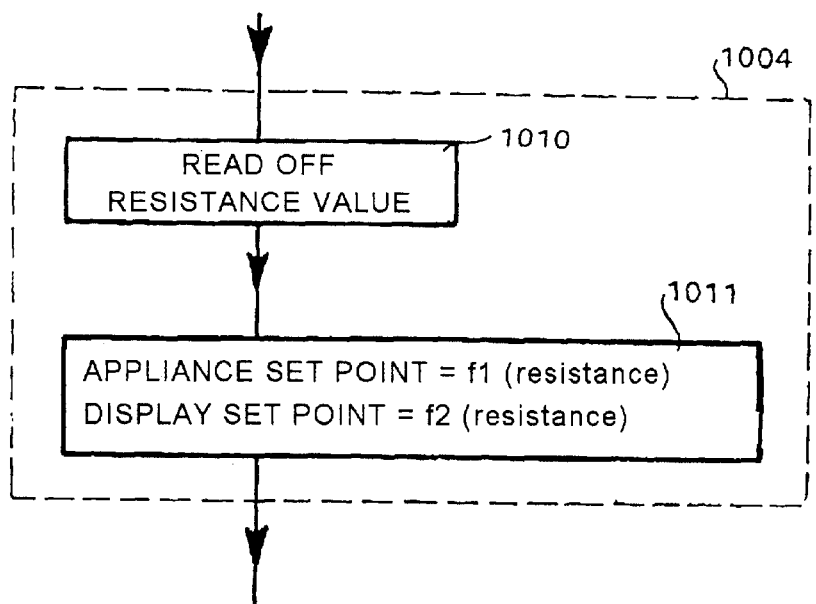
FIG. 8 explains substeps of a step of the operating program shown in FIG. 6 for a control device for a lamp for determining an appliance set point and a display set point.
Figure 9:
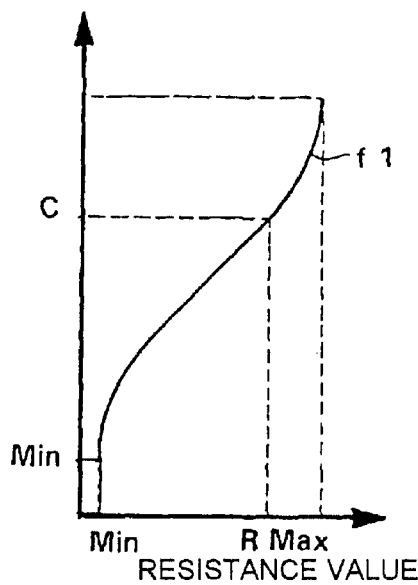
FIGS. 9 and 10 are curves representing the variation of the appliance set point and the display set point as a function of a resistance read by the processor unit of the control device used in the operating program step shown in FIG. 8.

If the keypad is operated, step 1004 is executed to determine the appliance set point and the display set point. As shown in FIG. 8, the step 1004 includes a first step 1010 for reading off the resistance at the terminals of the closed resistive circuit 110, which is representative of the area of the keypad operated, i.e. the area of the touch-sensitive region of the keypad pressed by a finger. In a subsequent step 1011 the resistance read off in step 1010 is used to determine the appliance set point to be transmitted to the appliance, using the function fl shown in FIG. 9.

Figure 10:
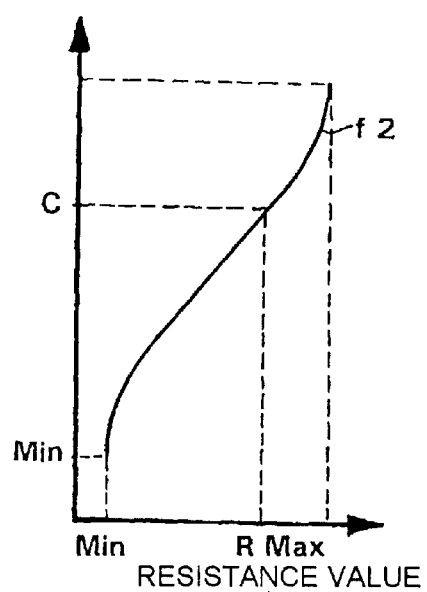

The display set point is also determined in step 1011 and depends on the resistance read off in the preceding step, in accordance with the curve f2 shown in FIG. 10.

The display set point is transmitted by the output interface via the matrix control connections means 233, 236 to the display means so that the display means display the target level assumed by the appliance.

In this example the processor unit 200 is adapted to provide the lamp with direct access to a brightness level selected on the keypad.

After step 1011, the appliance set point and display set point values determined in the above manner are stored in the corresponding area of the memory 222 of the microcontroller.

According to the flowchart of the operating program shown in FIG. 6, if the off key is operated the appliance set point is set to the off value and the appliance is switched off, and the display set point can correspond either to maintaining at full brightness the diode that was switched on at the time the appliance was switched off or to setting the diode that was switched on at the time the appliance was switched off to the standby level, so that it indicates to the user the current level to which the appliance was set before it was switched off.

In another embodiment, the appliance to be controlled by the control device according to the invention is a roller blind and the levels assumed by the appliance are levels of the blind varying between top and bottom limit levels corresponding to top and bottom end of travel position positions of the blind. The processor unit 200 is adapted, according to how the keypad 110 is operated, to determine and to transmit to the blind an instruction to raise or lower it for a given time such that the blind reaches the selected position.

The control device advantageously operates in an open loop, i.e. with no sensor for the position of the blind.

Figure 12:
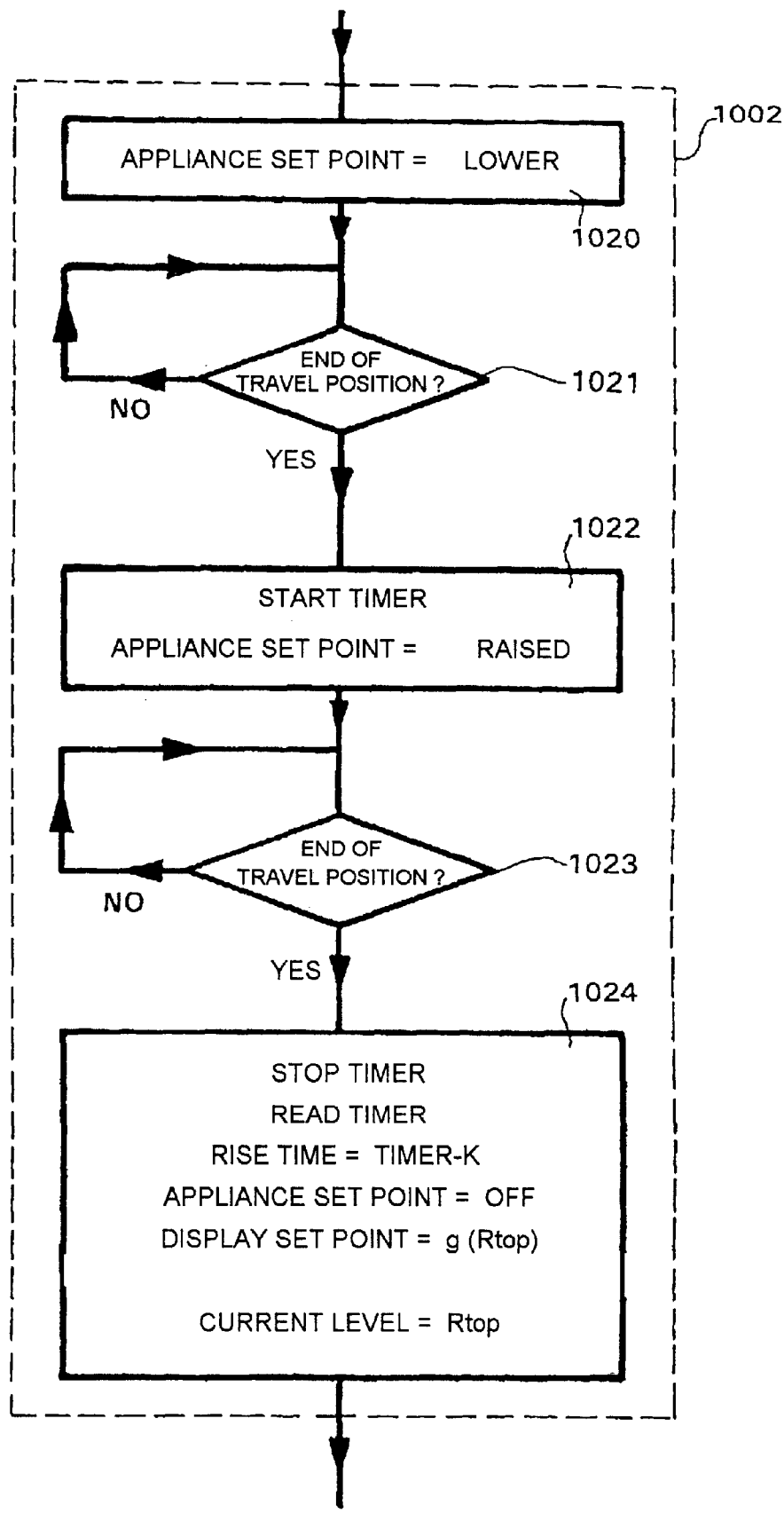
FIG. 12 explains various steps of an operation of initializing the operating program shown in FIG. 6 for a control device for a roller blind.

The time to raise or lower the blind is then determined by the processor unit, starting from an initialization step 1002 that will now be described with reference to FIG. 12.

During the initialization step 1002, the roller blind is lowered until it reaches the bottom end of travel position, which corresponds to execution of steps 1020 and 1021. In step 1020 the appliance set point is set to the "lower" value. Step 1021 is a blind end of travel position test step. When the end of travel position is reached, a step 1022 is executed to start a timer and the appliance set point is set to the "raise" value so that the blind is raised to the top end of travel position (test step 1023). When the blind reaches the top end of travel position, which is tested in step 1023, the timer is stopped in step 1024, the time counted by the timer is read off and a blind raising time is determined.

In a step 1024 the appliance set point is set to the "off" value and the display set point is set to a value equal to "g (Rtop)" (see the curve in FIG. 22), in which Rtop is the resistance corresponding to a top limit level of the blind and the current level of the appliance is set to the value corresponding to the top limit level, i.e. in this instance to the resistance R equal to Rtop.

Figure 11:
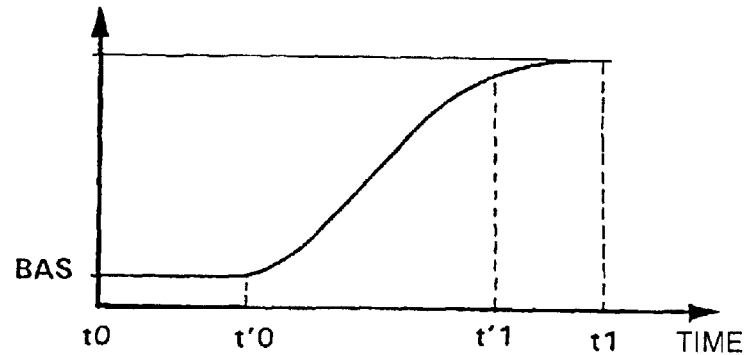
FIG. 11 is a curve representing the position of a roller blind as a function of time when the blind is controlled by a control device of the type shown in FIG. 1.

The blind raising time is determined in step 1024 from the curve shown in FIG. 11. The curve shows the effective blind raising time between the bottom limit position (blind closed) and the top limit position (blind open). As can be seen in FIG. 11, the curve has a substantially linear intermediate part and two stepped end parts. The staircase at the bottom end of the curve extends between time values t0 and t'0, the value t'0–t0 to corresponding to the time for the blind to start moving when the motor driving the blind starts to rotate. This time corresponds to reeling in the surplus length of the blind before it actually begins to rise. The staircase at the top end of the curve extends between the time values t'1 and t1, the value t1 representing the time at which the blind is completely rolled up at the top limit position, in which an end of travel switch controlling the motor is opened, and the value t'1 representing the time at which the blind reaches an end stop at the top of the slideway of the blind. The value t1–t'1 represents the time to roll up the blind completely, with the slats of the blind wrapped tightly around the drive spindle.

Referring to the curve shown in FIG. 11, the blind raising time determined in step 1024 is equal to the difference between the time counted by the timer between starting in step 1022 and stopping in step 1024 and a constant value K corresponding to the value (t'0–t0)+(t1–t'1).

With the blind raising time determined in this way, the appliance set point, the display set point and the current level of the blind are stored in the corresponding area of the memory 222 of the microcontroller 220.

Figure 13:
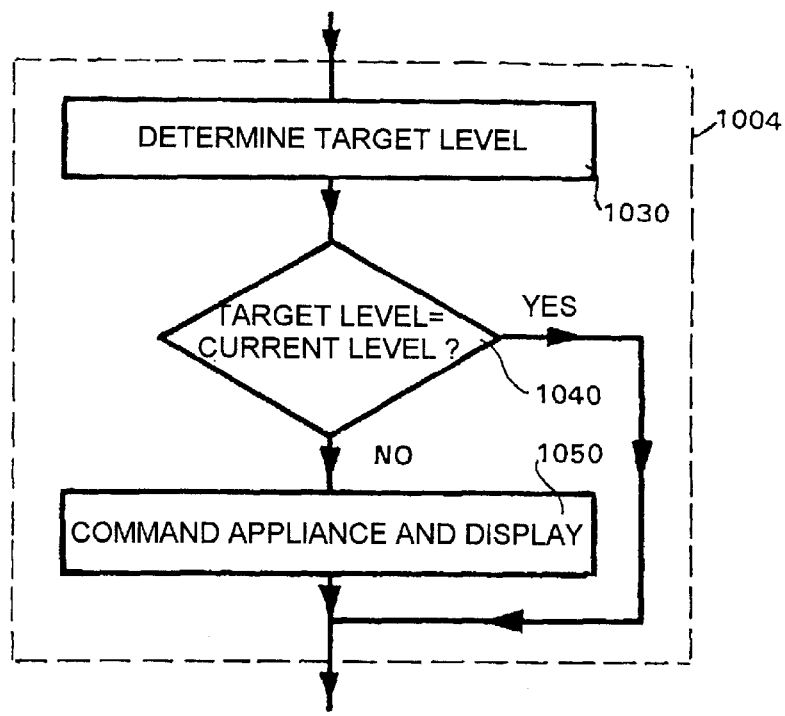
FIG. 13 explains various substeps of a step of the operating program shown in FIG. 6 for determining the appliance set point and the display set point for a control device for a roller blind.

If the keypad is operated, step 1004 is executed to determine the appliance set point and the display set point. As shown in FIG. 13, step 1004 includes a substep 1030 for determining the target level, a test substep 1040 for comparing the target level determined in substep 1030 to the current level of the appliance, and a substep 1050 for determining the appliance set point and the display set point for controlling the blind and displaying the movement of the blind. The substep 1050 is executed only if it is determined in step 1040 that the target level selected is different from the current level of the appliance.

Figure 14:
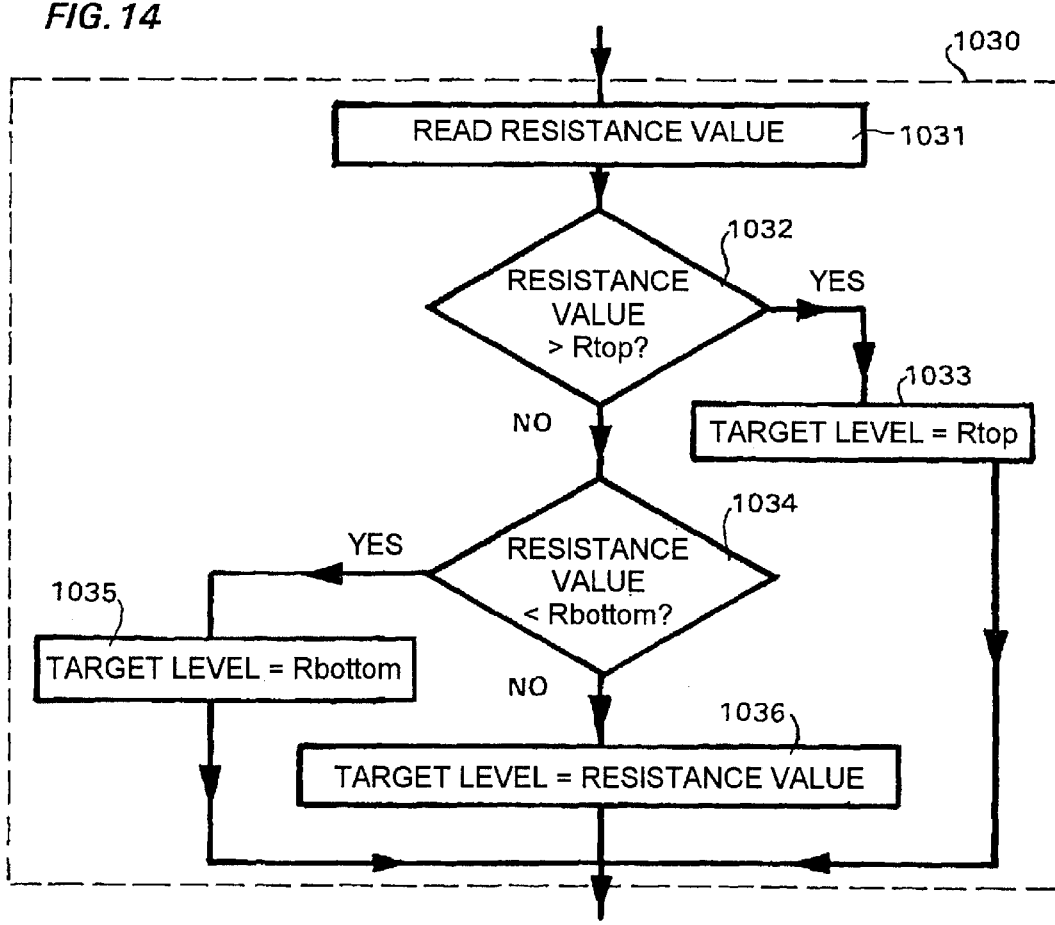
FIG. 14 explains various substeps of a step of determining a target level constituting a substep of the operating program step shown in FIG. 13.

The step 1030 of determining the target level will now be described with reference to FIG. 14.

To determine the target level to be assumed by the appliance, which is selected by operating the keypad, the resistance at the terminals of the closed resistive circuit 110 is read off in step 1031 and then compared in a test step 1032 to the top limit resistance Rtop corresponding to the top limit position of the blind. If the resistance read off is greater than the value Rtop, then in step 1033 the target level is assigned the value Rtop. If the resistance read off is less than the value Rtop, then a test step 1034 is executed to compare the resistance read off to the value Rbottom corresponding to the bottom limit position of the blind. If the resistance read off is less than Rbottom the value Rbottom is assigned to the target level in step 1035, whereas if the resistance read off is not less than Rbottom the resistance read off is assigned to the target level in step 1036.

The target level is a value stored in the corresponding area of the memory 222 of the microcontroller 220 and updated each time the keypad is operated.

After the substep 1030 a test step 1040 compares the target level determined in this way to the current level of the appliance before the keypad was operated, and if that target level is different from the current level a substep 1050 is executed to control the appliance and the display so that the blind reaches the corresponding target position (see FIG. 13).

Of course, if the target level is equal to the current level of the blind, the appliance and the display do not respond, the roller blind remains at the current level and the display continues to indicate the current level.

The substep 1050 will now be described in more detail with reference to FIG. 15.

The time T for the blind to move between its current position (current level) and the target position (target level) selected on the keypad is determined in a first step 1051.

The displacement time T is determined from the following formula:

$$T = (|\text{target level} - \text{current level}| / (R\text{top} - R\text{bottom})) \times (\text{raise time})$$

where the raise time is determined during the initialization operation 1002 as previously described, the value Rtop is the resistance corresponding to the top limit position of the blind, and the value Rbottom is the resistance corresponding to the bottom limit position of the blind.

After the displacement time T is determined in step 1051, a test step 1052 is executed to determine if the target level is below or above the current level and to deduce the direction of movement of the blind accordingly.

If the target level selected by operating the keypad is below the current level, then the instruction is given to raise the blind, i.e. in step 1054 the appliance set point is set to the "raise" value and transmitted to the blind by the output interface. This amounts to operating the drive motor of the blind in the rotation direction for raising the blind. If the target level is lower than the current level the appliance set point transmitted in step 1053 by the output interface to the blind is equal to the "lower" value, which amounts to operating the drive motor of the blind in the rotation direction which lowers the blind.

The timer is simultaneously started in step 1055 so that the blind is raised or lowered for the displacement time T determined in step 1051. During the raising or lowering of the blind, the timer is read during a step 1056 and a test step 1057 is executed to compare the timer reading with the displacement time T previously determined.

If the timer reading is less than the displacement time T determined in step 1051, the display set point is updated in step 1061 using the following formula:

$$\text{display set point} = (\text{timer}/T) \times |g(\text{target level}) - g(\text{current level})|$$

so that the necessary diodes are switched on and off successively between the current level and the target level to be reached by the blind, to show the progress of the blind between the current position and the selected target position.

The diodes corresponding to the target position are switched on simultaneously.

Figure 22:
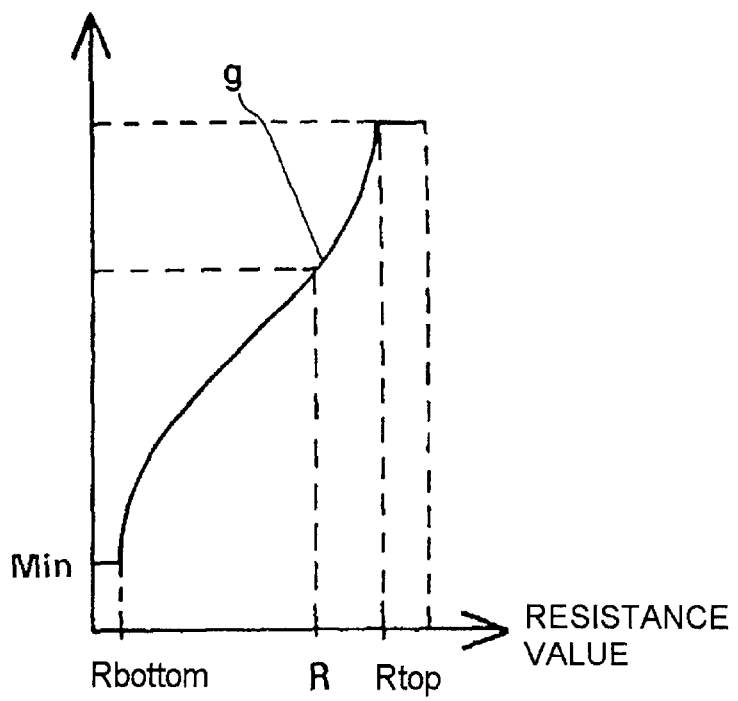
FIG. 22 shows the variation of the display set point as a function of a resistance read by the processor unit of a control device in accordance with the invention for a roller blind.

FIG. 22 shows the curve "g" giving the value of the display set point as a function of the target level.

Following the test step 1057, when the timer has reached the displacement time T determined in step 1051, the appliance set point is set to the "off" value and transmitted to the appliance so that the roller blind stops during a step 1060. In step 1060 the current level is set to the target level and the display set point is set to the value g(current level). All of these values are stored in the corresponding area of the memory 222 of the microcontroller 220.

Figure 15:
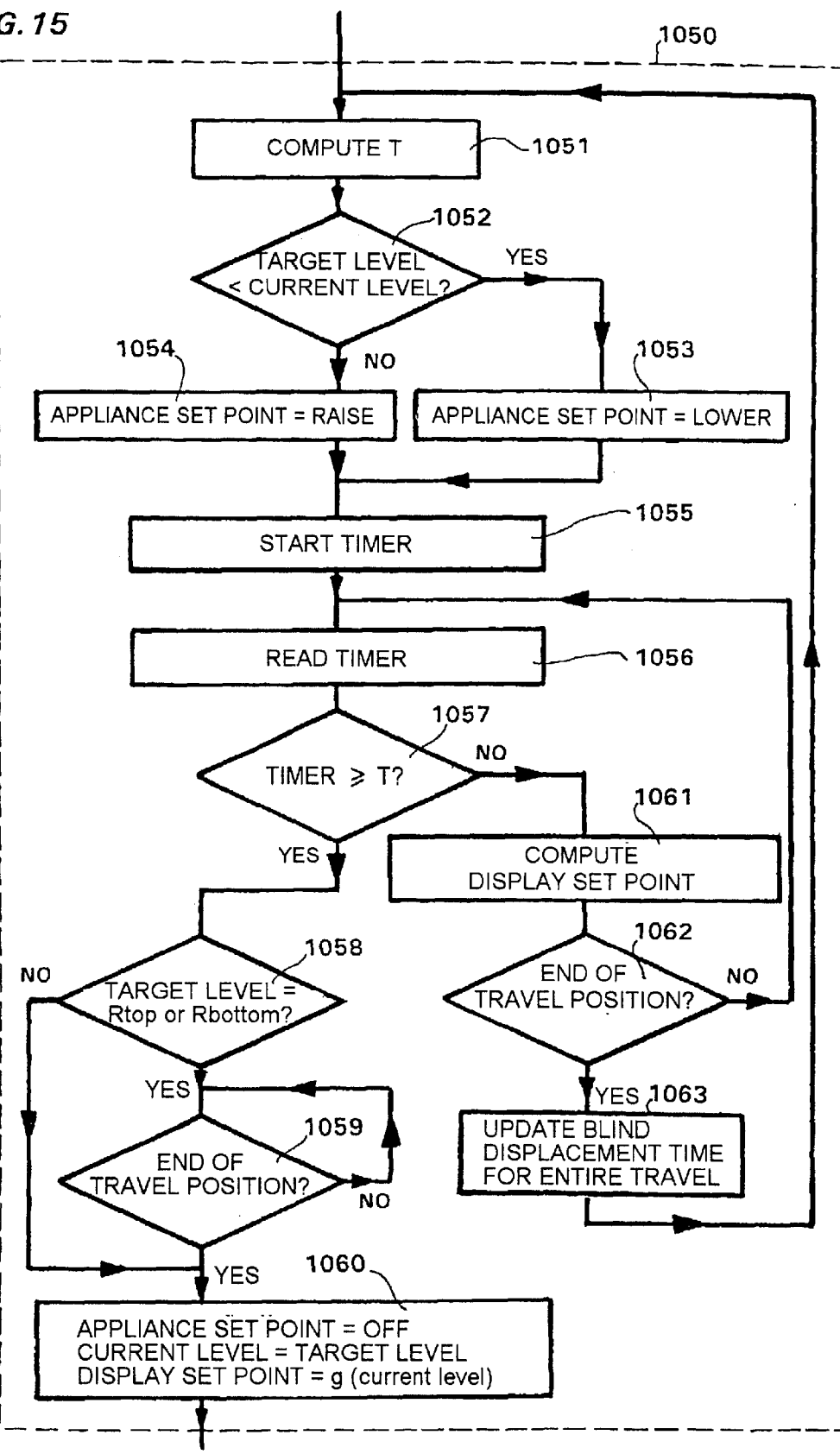
FIG. 15 represents various substeps of step of controlling the appliance and the display constituting a substep of the operating program step shown in FIG. 13.

As shown in the FIG. 15 flowchart, a test step 1058 is provided to move the blind directly to the top end of travel position or the bottom end of travel position, respectively, if the target position selected by operating the keypad is greater than or equal to, respectively less than or equal to, a top threshold Rtop, respectively a bottom threshold Rbottom of the keypad.

The test step 1058 determines if the selected target level is equal to the value Rtop or Rbottom and if so the blind is moved directly to the top or bottom position, respectively, without taking any account of any displacement time of the blind, by executing the end of travel position test step 1059.

It is interesting to note that in this case the processor unit determines a theoretical displacement time of the blind between its current position and its selected end of travel position. It compares the theoretical displacement time to the actual displacement and if they do not match it executes a step (not shown) to update the displacement time of the blind for the entire travel of the blind. That step is identical to the step 1063 described hereinafter.

If the blind reaches a top end of travel position or a bottom end of travel position during raising or lowering the blind before the displacement time T determined in step 1051 has totally elapsed, the displacement time of the blind for the entire travel is updated. This corresponds to executing the end of travel position test step 1062 and the updating step 1063 if the end of travel position test is positive.

If the blind reaches its top or bottom end of travel position, contacts open in the motor subsystem to open the electrical circuit connecting the motor subsystem to the output interface of the processor unit. The output interface transmits information to the microcontroller which sends back an appliance set point equal to the "off" value. For clarity, because it is a function of the motor subsystem, this opening of the circuit is not shown in FIG. 5.

Accordingly, if a top or bottom end of travel position is selected by means of the keypad, the control device opens in "closed loop" mode with feedback of information from the motor via the output interface to the microcontroller.

The method of controlling the roller blind to move it from a current position to a target position using the control device previously described includes the following steps, starting from operation of the keypad by the user:

a) determining the target position selected by operating the keypad, b) determining the displacement time of the blind between its current position and the target position, c) determining the direction of displacement of the blind, i.e. raising it or lowering it, for it to reach the selected target position from its current position, d) raising or lowering the blind for the time determined in step b) so that the blind reaches the target position, and e) storing the target position as the current position of the blind, in which method steps a) to d) are executed so that, if the roller blind is switched on and the keypad is operated to select a target position, the blind assumes the selected target position if it is different from its current position.

If the target position selected by operating the keypad is greater than or equal to, respectively less than or equal to, a top threshold, respectively a bottom threshold, of the keypad, the roller blind is moved directly to the top end of travel position, respectively the bottom end of travel position.

If the blind reaches a top end of travel position or a bottom end of travel position during step d) before the time determined in step b) has totally elapsed, the displacement time of the blind for the entire travel is updated.

In an embodiment that is not shown an initialization step identical to that performed when the control device is switched on could be carried out.

The method of controlling the blind using the control device previously described operates in "open loop" mode, i.e. with no sensor for the position of the blind, by determining the time for the blind to move between the current position and a selected target position.

The present invention is no way limited to the embodiment described and shown and the person skilled in the art will be able to envisage many variants conforming to the spirit of the invention.

In particular, in an embodiment of the invention that is not shown, the keypad can include a movable button controlling a variable resistance, the movement of the button corresponding to the selection of a target level to be assumed by the appliance, and an "on" key connected by connecting means to the processor unit and integrated into the movable button, the processor unit including means for reading off the resistance of the variable resistance when the "on" key is operated, the resistance read off being representative of the position of the button, and means for determining, from the resistance read off, an appliance set point which is transmitted to the appliance so that it assumes the corresponding selected target level.

The method and the device according to the invention apply to any form of direct control of level (of light, heat, etc.) and to any form of direct control of position (of a roller blind, a shutter, etc.).

What is claimed is:

1. A control device for an appliance adapted to assume a level selected from a range of levels, the device comprising a keypad representative of said range of levels to enable a user to select a level, an "off" key for switching off said appliance, and a processor unit connected to said keypad and to said "off" key, wherein, when said appliance is off and said keypad is operated to select a target level, said processor unit causes said appliance to assume the selected target level, when said appliance is off and said "off" key is operated, said processor unit leaves said appliance switched off, when said appliance is on and said keypad is operated to select a target level, said processor unit causes said appliance to assume the selected target level if that level is different from its current level, and when said appliance is on and said "off" key is operated, said processor unit switches off said appliance.

2. The device claimed in claim 1 wherein said processor unit includes means for monitoring separately operation of said keypad and operation of said "off" key.

3. The device claimed in claim 1 wherein said processor unit has an input interface connected to said keypad and to said "off" key, an output interface connected to said appliance, and a microcontroller connected to said input interface and to said output interface which applies to said appliance an appliance set point determined under the control of said microcontroller.

4. The device claimed in claim 1 including means for displaying said current level of said appliance connected to said processor unit.

5. The device claimed in claim 4 wherein said processor unit is adapted to maintain said display means active after said appliance is switched off to show the current level of said appliance before it was switched off.

6. The device claimed in claim 5 wherein said processor unit is adapted to place said display means in a standby state after said appliance is switched off.

7. The device claimed in claim 6 wherein said standby state of said display means consists of a reduced brightness of said display means.

8. The device claimed in claim 4 including means for displaying a change of level of said appliance.

9. The device claimed in claim 4 wherein said display means include at least one row of light-emitting diodes facing said keypad.

10. The device claimed in claim 4 wherein said display means include at least one row of bargraphs.

11. The device claimed in claim 1 including keypad marking means.

12. The device claimed in claim 1 wherein said keypad has at least one touch-sensitive region provided with means for recognizing an area of said touch-sensitive region pressed by a finger and corresponding to the selection of a target level to be assumed by said appliance and said recognition means are connected to said processor unit which is adapted to determine from the recognized pressed area and to transmit to said appliance an appliance set point such that said appliance assumes the selected target level.

13. The device claimed in claim 12 wherein said touch-sensitive region comprises three subregions, namely:
   a top subregion representing a top limit level assumed by said appliance,
   a bottom subregion representing a bottom limit level assumed by said appliance, and
   an intermediate subregion between said top and bottom subregions and representative of a range of intermediate levels assumed by said appliance between said top and bottom limit levels.

14. The device claimed in claim 12 wherein said recognition means of said touch-sensitive region are of the resistive type.

15. The device claimed in claim 14 wherein said recognition means include an open circuit whose terminals are connected to said processor unit and which is formed of two comb-like parts with substantially parallel resistive backs and interleaved conductive teeth, said touch-sensitive region being such that pressing a finger onto an area of said touch-sensitive region closes said circuit by virtue of contact between at least one tooth of one part with at least one tooth of the other part, said processor unit including means for reading off the value of the resistance between said terminals of the closed circuit, said resistance being representative of said area pressed, and means for determining from said resistance read off an appliance set point to be transmitted to said appliance so that said appliance assumes the corresponding selected target level.

16. The device claimed in claim 15 wherein said touch-sensitive region has substantially parallel conductive tracks extending generally transversely to and above said interleaved teeth of said two parts of said circuit and said conductive tracks are adapted, when a finger presses on said touch-sensitive region, to come into contact with at least one tooth of each of said parts of said circuit to close it at the level of said pressed area.

17. The device claimed in claim 15 including means for displaying said current level of said appliance connected to said processor unit and wherein said processor unit includes means for determining a display set point from said resistance read off and means for transmitting said display set point to said display means to display the corresponding selected target level assumed by said appliance.

18. The device claimed in claim 1 wherein said keypad includes a movable button controlling a variable resistance, movement of said button corresponding to selection of a target level to be assumed by said appliance, and an "on" key connected to said processor unit and integrated into said movable button, said processor unit including means for reading off the resistance of said variable resistance when said "on" key is operated, said resistance being representative of the position of said button, and means for determining from said resistance read off an appliance set point to be transmitted to said appliance so that said appliance assumes the corresponding selected target level.

19. The device claimed in claim 1 including an external installation connected to said processor unit and adapted to supply a set point for selecting a target level in said range of levels to said processor unit which is adapted to transmit said set point to said appliance so that it assumes the selected target level if it is different from its-current level.

20. The device claimed in claim 19 wherein said processor unit includes means for controlling the priorities of information that it receives from said keypad and from said external installation so that said information from said keypad has a higher priority than said information from said external installation.

21. The device claimed in claim 19 wherein said external installation is a meteorological station.

22. The device claimed in claim 19 wherein said external installation is a detector responsive to the presence of a person.

23. The device claimed in claim 19 wherein said external installation is a thermostat.

24. The device claimed in claim 1 wherein said appliance is a lamp, the levels assumed by said appliance are brightness levels varying between a bottom limit level corresponding to a minimum brightness and a top limit level corresponding to a maximum brightness, and said processor unit is adapted, when said keypad is operated, to determine a fractional brightness and transmit it to said lamp.

25. The device claimed in claim 24 wherein said processor unit is adapted to provide said lamp with direct access to a brightness level selected using said keypad.

26. The device claimed in claim 1 wherein said appliance is a roller blind and said levels to be assumed by said device are positions of said blind varying between top and bottom limit levels corresponding to top and bottom end of travel positions of said blind and said processor unit is adapted, when said keypad is operated, to determine and to transmit to said blind an instruction to raise or lower said blind for a given time so that said blind reaches the selected position.

27. The device claimed in claim 26 wherein said processor unit determines the time for which said blind is raised or lowered by means of an initialization operation during which said processor unit causes said blind to move between said top and bottom end of travel positions, measures the time taken by said blind to perform said movement, and stores the measured time.

28. The device claimed in claim 26 wherein said processor unit includes means for storing the current position of said blind, and, when a target position of said blind, is selected by operating said keypad, to determine and to transmit to said blind said instruction to raise or lower said blind for a given time so that it reaches the selected target position from its current position.

29. The device claimed in claim 26 wherein said processor unit includes means for moving said blind directly to its top end of travel position, respectively bottom end of travel position, if a target level is selected by operating said keypad that is above, respectively below, a particular top threshold, respectively a particular bottom threshold.

30. The device claimed in claim 26 wherein said processor unit includes means for updating the displacement time of said blind for its entire travel if said blind reaches said top end of travel position, respectively bottom end of travel position, when said blind raising time, respectively said blind lowering time, determined by said processor unit has not totally elapsed.

31. A user module for a control device for an appliance adapted to assume a level selected from a range of levels, which control device includes a keypad representative of said range of levels to enable a user to select a level, an "off" key for switching off said appliance, and a processor unit connected to said keypad and to said "off" key, which user module includes:

an elongate touch-sensitive region constituting said control keypad of said control device, an "off" key located near one end of said touch-sensitive region, and means for displaying said current level and said target level of said appliance extending in a line along at least one longitudinal side of said touch-sensitive region.

32. The module claimed in claim 31 wherein said display means extend from said "off" key to the opposite end of said touch-sensitive region.

33. The module claimed in claim 31 wherein said display means extend along both longitudinal sides of said touch-sensitive region.

34. The module claimed in claim 33 wherein said display means include at least one row of diodes regularly spaced along said touch-sensitive region.

35. The module claimed in claim 31 wherein said touch-sensitive region is subdivided into three subregions:

a top subregion representing a top limit level assumed by said appliance, a bottom subregion representing a bottom limit level assumed by said appliance, and an intermediate subregion between said top and bottom subregions and representative of a range of intermediate levels assumed by said appliance between said top and bottom limit levels.

36. The module claimed in claim 31 wherein said touch-sensitive region has means for recognizing an area of said touch-sensitive region pressed by a finger and corresponding to the selection of a target level to be assumed by said appliance and said recognition means are connected to said processor unit which is adapted, from the recognized pressed area, to determine and to transmit to said appliance an appliance set point such that it assumes the selected target level.

37. The module claimed in claim 36 wherein said recognition means of said touch-sensitive region are of the resistive type.

38. The module claimed in claim 37 wherein said recognition means include an open circuit whose terminals are connected to said processor unit and which is formed of two comb-like parts with substantially parallel resistive backs and interleaved conductive teeth, said touch-sensitive region being such that pressing a finger onto an area of said touch-sensitive region closes said circuit by virtue of contact between at least one tooth of one part with at least one tooth of the other part, said processor unit including means for reading off the value of the resistance between said terminals of the closed circuit, said resistance being representative of said area pressed, and means for determining from said resistance read off an appliance set point to be transmitted to said appliance so that said appliance assumes the corresponding selected target level.

39. The module claimed in claim 38 wherein said touch-sensitive region has substantially parallel conductive tracks extending generally transversely to and above said interleaved teeth of said two parts of said circuit and said conductive tracks are adapted, when a finger presses on said touch-sensitive region, to come into contact with at least one tooth of each of said parts of said circuit to close it at the level of said pressed area.

40. The module claimed in claim 31 wherein said touch-sensitive region has at one end, respectively at an opposite end, an indication for the user of said top limit level, respectively said bottom limit level, that can be assumed by said appliance.

41. The module claimed in claim 40 wherein said "off" key is located near the end of said touch-sensitive region having said indication of said bottom limit level that can be assumed by said appliance.

42. A control device for a roller blind adapted to assume a position selected from a range of positions varying between top and bottom limit levels corresponding to top and bottom end of travels positions of said blind, which control device includes a keypad representative of said range of positions to enable a user to select a position, an "off" key for switching off said blind, and a processor unit connected to said keypad and to said "off" key, said processor unit is adapted, when said keypad is operated, to determine and to transmit to said blind an instruction to raise or lower said blind for a given time so that said blind reaches the selected position, and said control device includes:

a) means for determining the target position responsive to keypad selection, b) means for determining the displacement time of said blind between its current position and said target position, c) means for determining the direction of displacement of said blind from its current position to said selected target position, d) means for raising or lowering said blind for said displacement time determined, and e) means for storing said target position as the current position of said blind, whereby when said roller blind is switched on and said keypad is operated to select a target position, said blind assumes said selected target position is said selected target position is different from the current position.

43. A control device claimed in claim 42 wherein said processor unit includes means for executing an initialization operation when said control device is switched on, said processor unit includes:

i) means for moving said blind to an end of travel position, ii) means for starting a timer, iii) means for moving said blind to an opposite end of travel position, iv) means for stopping said timer and reading off the time counted by said timer, and v) means for storing said time counted by said timer as said displacement time of said blind for an entire travel between said end of travel position and said opposite end of travel position.

44. A control device claimed in claim 43 wherein said processor unit comprises means for displaying said top end of travel position of said blind.

45. A control device claimed in claim 44 which comprises means for displaying the displacement of said blind between its current position and said target position by successively turning light-emitting diodes on and off.

46. A control device claimed in claim 45 which comprises means for displaying said target position simultaneously with the displacement of said blind.

47. A control device claimed in claim 42 wherein said processor unit comprises means for determining if the selected target position is greater than or equal to, respectively less than or equal to, a top threshold, respectively a bottom threshold, and means for moving said blind directly to said top end of travel position, respectively said bottom end of travel position, independently of the determined displacement time of said blind.

48. A control device claimed in claim 42 wherein said processor unit comprises mean for reading off a resistance at the terminals of a resistive circuit of said keypad and means for determining said displacement time of said blind as a function of its displacement time for an entire travel between an end of travel position and an opposite end of travel position from the difference between resistances read off corresponding to said current position and said target position and from the difference between resistances read off corresponding to said top and bottom end of travel positions.

49. A control device claimed in claim 42 wherein said "off" key can stop said blind at any time.

* * * * *

UNITED STATES PATENT AND TRADEMARK OFFICE
CERTIFICATE OF CORRECTION

PATENT NO. : 6,512,338 B2  Page 1 of 1
DATED : January 28, 2003
INVENTOR(S) : Jean-Pierre Cousy It is certified that error appears in the above-identified patent and that said Letters Patent is hereby corrected as shown below:

Title page,
Amend the line appearing below the ABSTRACT to read as follows:

-- 50 Claims, 8 Drawing Sheets --.

Column 20,
Line 52, add claim 50, as follows:

-- 50. A control device claimed in claim 45 which comprises means for displaying said current position of said blind between two operations of said keypad. --

Signed and Sealed this

Seventeenth Day of June, 2003

JAMES E. ROGAN
*Director of the United States Patent and Trademark Office*